M. C. RYPINSKI.
ELECTRIC MEASURING INSTRUMENT.
APPLICATION FILED MAY 4, 1908.
1,059,004.
Patented Apr. 15, 1913.
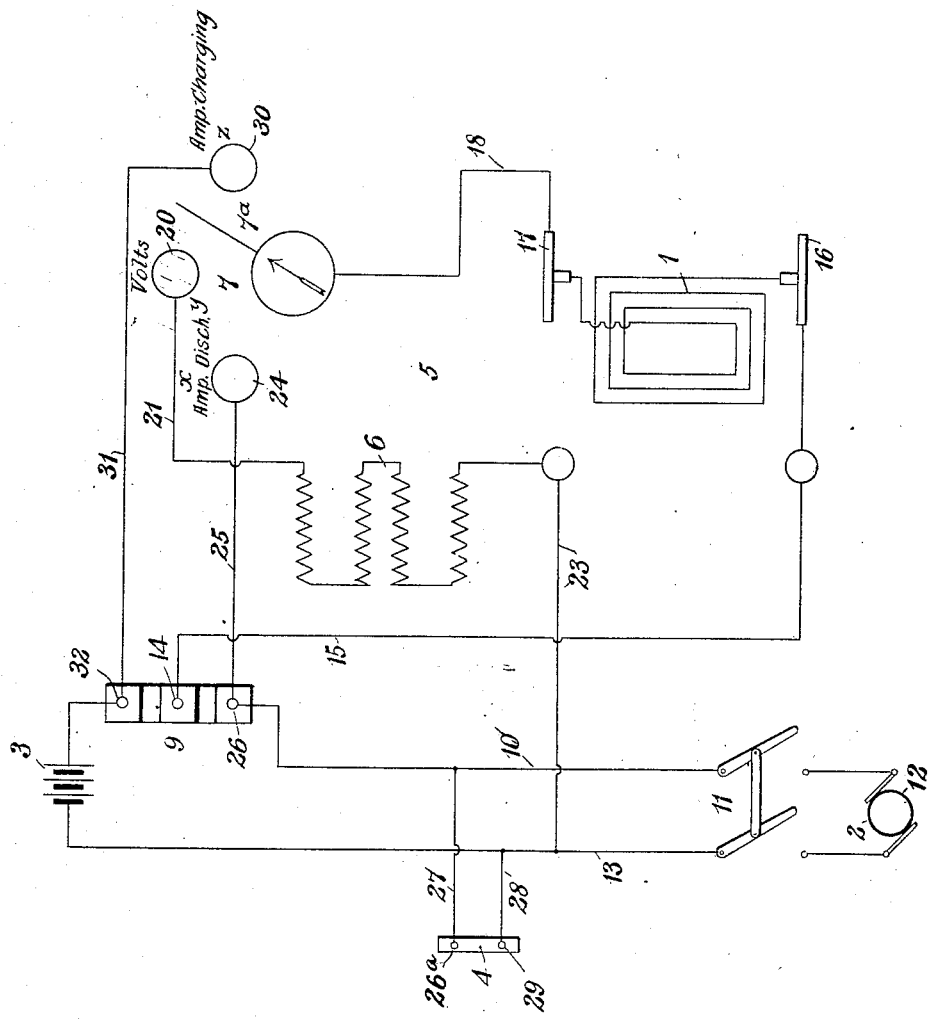
WITNESSES
INVENTOR
Maurice C. Rypinski
BY
ATTORNEY

UNITED STATES PATENT OFFICE.

MAURICE C. RYPINSKI, OF NEW YORK, N. Y., ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

ELECTRIC MEASURING INSTRUMENT.

1,059,004.   Specification of Letters Patent.   Patented Apr. 15, 1913.

Application filed May 4, 1908. Serial No. 430,853.

*To all whom it may concern:*

Be it known that I, MAURICE C. RYPINSKI, a citizen of the United States, and a resident of New York, in the county of New York and State of New York, have invented a new and useful Improvement in Electric Measuring Instruments, of which the following is a specification.

My invention relates to systems embodying electric storage apparatus and it has for its object to provide a system embodying a single measuring instrument that shall be adapted for indicating either the voltage of a circuit which connects an electric motor to a storage battery; the charging current which is applied to the battery, or the current which is supplied from the battery to the motor during the operation of the system.

Electric driving motors for automobiles or other vehicles are frequently supplied with energy from storage batteries carried by such vehicles. Automobiles equipped in this manner are capable of running for a predetermined length of time until the energy stored in the battery is reduced, when it becomes necessary to replenish or charge the battery, this being accomplished, in a well known manner, by applying a voltage to the battery somewhat in excess of the normal voltage produced by the battery itself and in opposition to it.

According to my present invention, I provide a system embodying a measuring instrument to indicate, by means of a single pointer, either the voltage of the line connecting the storage battery and the motor, the current supplied to the battery during the charging period, or the current supplied to the motor from the storage battery during the operation of the vehicle; a manually-operated switching device for effecting suitable circuit connections, and a three-point shunt, to an intermediate point of which one terminal of the instrument is connected.

The single figure of the accompanying drawing is a diagrammatic view of a system embodying my invention.

I deem it unnecessary to describe, in detail, the operating mechanism of the meter, since this mechanism forms no part of my present invention and since any suitable measuring instrument having a movable coil, as shown in the drawing, may be employed. The system comprises an electric motor 2, a storage battery 3, a charging plug 4 and a measuring instrument 5 having a movable coil 1, a resistor 6 and a selective switch 7. The movable arm $7^a$ of the switch 7 is adapted to occupy any one of three positions $x$, $y$ and $z$, which are respectively marked "Amperes discharging," "Volts" and "Amperes charging."

The circuit connections for, and the operation of, the system are as follows: Assuming that energy is supplied from the positive terminal of the storage battery 3 through shunt 9, conductor 10 and switch 11 to the motor 2; circuit is completed through the motor armature 12 and conductor 13 to the negative terminal of the battery. If, under these conditions, it is desired to measure the voltage of the supply circuit, the arm $7^a$ of the selective switch 7 is moved to position $y$ which is marked "Volts," whereupon a circuit is completed, from an intermediate point 14 of the shunt 9, through a conductor 15, spring support 16 for the movable coil 1, said coil, spring support 17, conductor 18, movable contact arm $7^a$ of the switch 7, contact member 20, conductor 21, meter resistor 6 and conductor 23 to the supply conductor 13. The coil of the meter is thus connected across the circuit in series relation with meter resistor 6 and, consequently, the voltage of the circuit will be indicated by suitable devices in the usual manner. If it is desired to measure the current which is delivered to the motor by the battery under these conditions, the arm $7^a$ of the selective switch 7 may be moved to position $x$, marked "Amperes discharging," in which case, a circuit will be established, from the positive terminal of the battery, through a portion of the shunt 9 to its middle point 14, circuit being continued from this point, as above indicated, through the movable coil of the meter to the selective switch and finally completed through contact arm $7^a$ (which now engages contact member 24) and conductor 25 to a terminal 26 of the shunt 9. It will be observed that the current traverses the coil 1 of the meter in the same direction as in the former case but is proportional to the current traversing the battery circuit, since the meter is connected in multiple circuit with a portion of the shunt, a suitable means being provided for indicating the current in amperes.

If it is desired to charge the battery, the switch 11 is opened and energy is supplied from any suitable external source through positive charging terminal 26ª and conductor 27, conductor 10 and the shunt 9 to the positive terminal of the battery, circuit being completed, from the negative terminal of the battery, through conductor 13 and conductor 28 to the negative terminal 29 of the charging plug 4. Since the conductor 10 is still positive, the voltage of the circuit may be read by moving the arm 7ª of the selective switch to position $y$, as before.

If it is desired to measure the current flowing into the battery, the arm 7ª of the selective switch 7 is moved to position $z$, which is marked "Amperes charging," whereupon a circuit is completed from conductor 27 through a portion of the shunt 9 to the intermediate terminal 14, and thence through the movable coil of the meter, as before, and is finally completed through movable contact member 7ª of the switch 7, contact member 30 and conductor 31 to a terminal 32 of the shunt 9. In this way, the meter current continues to flow in the same direction through its movable coil but the meter indication will now be a measure of the current traversing that portion of the shunt 9 which is between the terminal 32 and 14.

Various structural modifications, as well as variations in the circuit connections of the system, may be made without departing from my invention, and I, therefore, desire that only such limitations shall be imposed as are indicated in the appended claims.

I claim as my invention:

1. The combination with a storage battery and an external circuit therefor, of a single-coil measuring instrument, means for diverting current from said circuit to said instrument and means for varying the connections for one terminal of the instrument to correctly indicate the current traversing the battery circuit during both charging and discharging operations.

2. The combination with an electric motor, a storage battery for supplying energy thereto, a shunt interposed between the said motor and said battery and having end and intermediate terminals, of a measuring instrument, and a three-point switching device associated therewith for indicating the voltage of the battery circuit, the current supplied to the battery, or the current supplied from the battery.

3. The combination with a receiving circuit, a storage battery connected thereto, and a shunt inserted in the battery circuit, of an electric measuring instrument comprising a movable coil, one terminal of said movable coil being connected to an intermediate point in the shunt and the other terminal of said coil being selectively connected to opposite extremities of the shunt.

4. The combination with a receiving circuit, a storage battery connected thereto, and a shunt connected in circuit therewith, of an electric measuring instrument having a movable coil, one terminal of which is connected to an intermediate point in the shunt, a resistor one terminal of which is connected to the unshunted side of the circuit, and selective means for connecting the other terminal of the movable coil to the free terminal of the resistor or to the one or the other of the end terminals of the shunt.

5. The combination with a storage battery, a receiving circuit connected thereto and a shunt included in the positive conductor of the circuit, of a measuring instrument comprising a movable coil having one terminal connected to an intermediate point in the shunt, a resistor having one terminal connected to the negative terminal of the battery, and a three-point switching device comprising a moving contact member connected to the free terminal of the movable coil, and a plurality of stationary contact terminals respectively connected to the end terminals of the shunt and to the free terminal of the resistor.

6. The combination with an electrical measuring instrument having a single set of electrically energized elements for indicating the amount of current flowing from or into a secondary battery or the battery voltage, of a shunt three-point switch for adjusting the circuits in accordance with the kind of reading desired.

7. The combination with an electrical measuring instrument having a single set of electrically energized elements for indicating the current supplied by or to a secondary battery or the voltage supplied by such battery, of a shunt three-point switch, the movable contact member of which is connected to the instrument winding and the stationary contact terminals of which are severally engaged by said movable contact member to provide the kind of reading desired.

In testimony whereof, I have hereunto subscribed my name this 29th day of April, 1908.

MAURICE C. RYPINSKI.

Witnesses:
 Wm. H. Capel,
 T. F. Brothers.